US011190405B2

(12) United States Patent
Phadke et al.

(10) Patent No.: US 11,190,405 B2
(45) Date of Patent: Nov. 30, 2021

(54) NETWORK TOPOLOGY GENERATION BASED ON NETWORK DEVICE INFORMATION

(71) Applicant: VMWARE, INC., Palo Alto, CA (US)

(72) Inventors: Nilesh Avinash Phadke, Pune (IN); Amol Manohar Vaikar, Pune (IN)

(73) Assignee: VMWARE, INC., Palo Alto, CA (US)

( * ) Notice: Subject to any disclaimer, the term of this patent is extended or adjusted under 35 U.S.C. 154(b) by 57 days.

(21) Appl. No.: 16/802,590

(22) Filed: Feb. 27, 2020

(65) Prior Publication Data
US 2021/0176133 A1 Jun. 10, 2021

(30) Foreign Application Priority Data

Dec. 10, 2019 (IN) .............................. 201941050992

(51) Int. Cl.
| | | |
|---|---|---|
| *G06F 13/00* | (2006.01) | |
| *H04L 12/24* | (2006.01) | |
| *H04L 29/12* | (2006.01) | |
| *H04L 12/751* | (2013.01) | |
| *H04L 12/741* | (2013.01) | |
| *H04L 12/46* | (2006.01) | |

(52) U.S. Cl.
CPC .......... *H04L 41/12* (2013.01); *H04L 12/4641* (2013.01); *H04L 45/02* (2013.01); *H04L 45/745* (2013.01); *H04L 61/6022* (2013.01)

(58) Field of Classification Search
USPC .......................................... 709/200; 370/254
See application file for complete search history.

(56) References Cited

U.S. PATENT DOCUMENTS

| | | | | |
|---|---|---|---|---|
| 7,085,224 | B1* | 8/2006 | Oran ................... | H04L 12/2854 370/216 |
| 7,380,025 | B1* | 5/2008 | Riggins .............. | H04L 41/0809 710/10 |
| 9,621,581 | B2* | 4/2017 | Thubert ............. | H04L 49/3009 |
| 9,634,927 | B1* | 4/2017 | Singh ................. | H04L 12/4641 |
| 2011/0080836 | A1* | 4/2011 | Bragg ................. | H04L 45/22 370/241.1 |
| 2013/0061034 | A1* | 3/2013 | Walheim, Sr. ...... | H04L 63/0272 713/150 |
| 2014/0211800 | A1* | 7/2014 | Chunduri ............. | H04L 61/103 370/392 |

(Continued)

*Primary Examiner* — Anthony Mejia

(57) ABSTRACT

In one example, a management node may include a storage device to store network device information associated with a plurality of network devices and physical hosts in a datacenter. Example network device information may include at least one of routing information and media access control (MAC) address information. Further, the management node may include a processor operable with the storage device and memory coupled to the processor. In one example, the memory may include a network topology generation unit to determine adjacency between the plurality of network devices in the datacenter using the routing information and/or media access control (MAC) address information associated with the plurality of network devices and generate a network topology including a network path between a source endpoint and a destination endpoint using the adjacency between the plurality of network devices.

22 Claims, 5 Drawing Sheets

(56) References Cited

U.S. PATENT DOCUMENTS

| | | | | |
|---|---|---|---|---|
| 2014/0313931 A1* | 10/2014 | Roper | ................... | H04L 41/14 |
| | | | | 370/254 |
| 2014/0313937 A1* | 10/2014 | Roper | ................... | H04L 45/02 |
| | | | | 370/255 |
| 2014/0317279 A1* | 10/2014 | Roper | ................... | H04L 43/10 |
| | | | | 709/224 |
| 2015/0016462 A1* | 1/2015 | Zhou | ................... | H04L 12/465 |
| | | | | 370/392 |
| 2021/0021517 A1* | 1/2021 | Sellappa | .............. | H04L 45/745 |

* cited by examiner

NETWORK TOPOLOGY GENERATION BASED ON NETWORK DEVICE INFORMATION

RELATED APPLICATIONS

Benefit is claimed under 35 U.S.C. 119(a)-(d) to Foreign Application Serial No. 201941050992 filed in India entitled "NETWORK TOPOLOGY GENERATION BASED ON NETWORK DEVICE INFORMATION", on Dec. 10, 2019, by VMware, Inc., which is herein incorporated in its entirety by reference for all purposes.

TECHNICAL FIELD

The present disclosure relates to computing environments, and more particularly to methods, techniques, and systems for generating a network topology based on network device information in virtual computing environments.

BACKGROUND

Computer virtualization is a technique that involves encapsulating a representation of a physical computing machine platform into a virtual machine (VM) that is executed under the control of virtualization software running on hardware computing platforms (also referred to herein as 'hosts', 'physical hosts', or 'host computing systems'). A group of hardware computing platforms may be organized as a cluster to provide hardware resources for virtual machines. Further, networking devices such as routers may forward data from one device (i.e., virtual machine) to another between networks. Furthermore, network switches may connect the devices within a network. Thus, in a datacenter, there may be multiple routers, switches, and other network devices. Further, such datacenters may have to be monitored to troubleshoot network issues. In this regard, a network topology of the datacenter may be generated to facilitate in troubleshooting the network issues. Example network topology may depict interconnections among devices in the network and/or across multiple networks.

Figure 1:
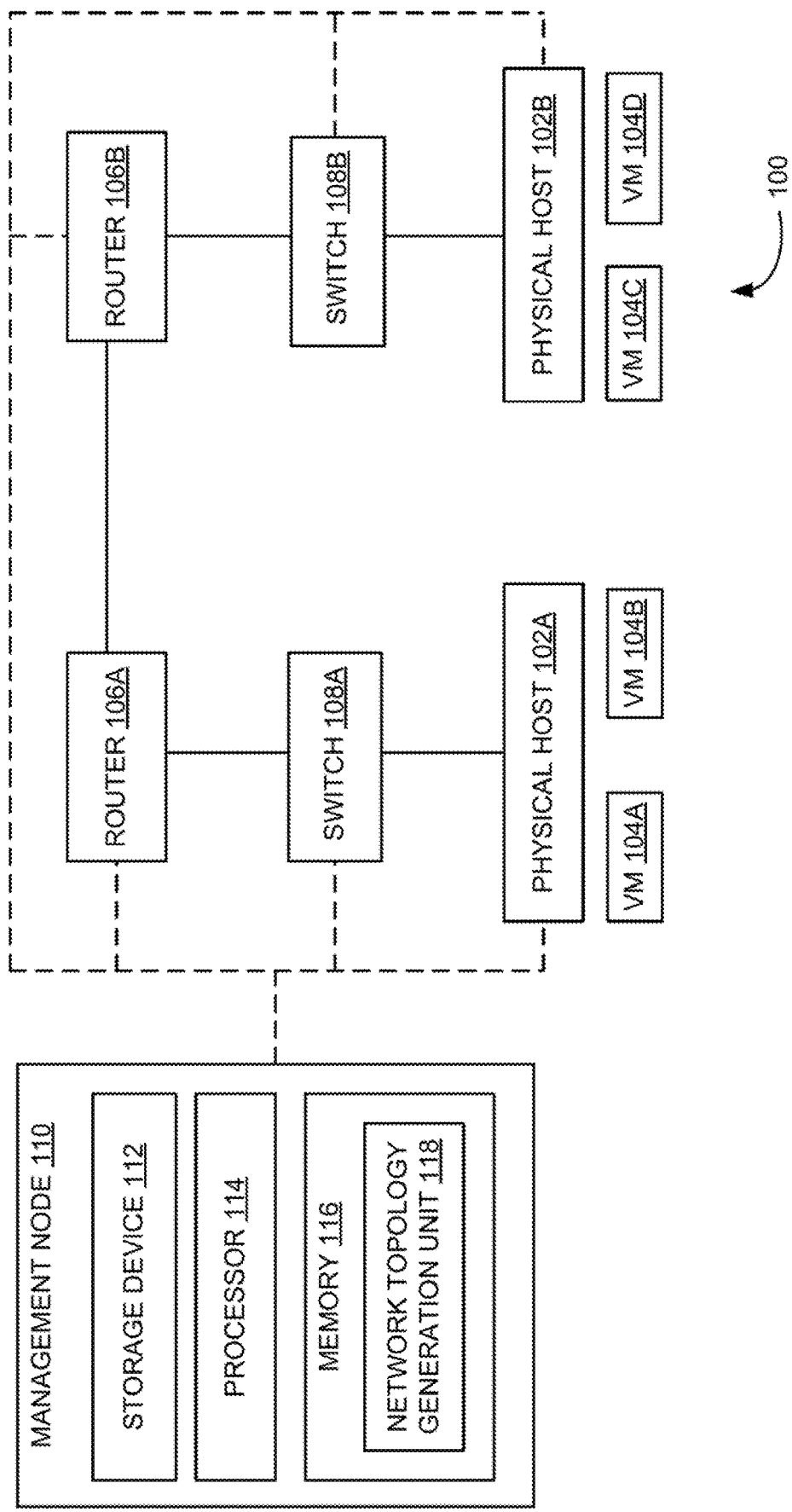
FIG. 1 is a block diagram of an example datacenter, including a network topology generation unit to generate a network topology based on network device information.

The drawings described herein are for illustration purposes only and are not intended to limit the scope of the present subject matter in any way.

DETAILED DESCRIPTION

Examples described herein may provide an enhanced computer-based and network-based method, technique, and system to generate a network topology based on network device information in a computing environment. Computing environment may be a virtual computing environment or a virtual datacenter (e.g., a cloud computing environment, a virtualized environment, and the like). The datacenter may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth).

Further, datacenters may include multiple network devices such as routers and switches to forward data from one device (e.g., virtual machine) to another device within a network and/or between networks. For example, networks may be commonly used for data-oriented applications such as delivering email, web content, and the like. Thus, example datacenter may be a virtual representation of the physical datacenter, complete with servers, storage clusters, and network devices, all of which may reside in virtual space being hosted by one or more physical datacenters.

Furthermore, a network topology may be generated corresponding to the datacenter to monitor the datacenter. The network topology may refer to physical and/or logical layout of a network. For example, the network topology may define ways in which different devices are placed and interconnected with each other in the datacenter. Also, the network topology may describe how the data is transferred between the devices.

In some examples, the network topology may be generated using standards-based protocols such as Link Layer Discovery Protocol (LLDP), proprietary protocols such as Cisco Discovery Protocol (CDP), Juniper Discovery Protocol (JDP), or the like. For example, network applications such as VMware® vRealize Network Insight (vRNI) may deliver operations for software-defined networking and security by building a highly-available and network infrastructure across multi-cloud environments. Such network applications may use the CDP/LLDP information for building the network topology or graph data structure to determine network device adjacency with detailed information about the physical and logical ports involved in the pairing. Further, the CDP/LLDP information may facilitate to determine a next hop network device while plotting network path from one virtual machine to another while traversing the intermediate switches/routers along with the ingress/egress interfaces used in the route including Equal-Cost Multi-Path (ECMP) routing.

However, the LLDP may be non-authenticated as the LLDP may suffer from hack referred as fuzzing, for instance. Fuzzing may be a method used to test software/hardware by sending illegal data in frames and observing how the device handles such data. Thus, the LLDP may include areas of concern for a network administrator. For example, hackers can vary data input in the LLDP frame and crash the switch, other devices, or at least cause a denial of service attack.

Further, the CDP may include information such as the make, model, and software version from the switch, for instance. Using such information, it would be trivial for an attacker to review a vulnerability database and then download any exploit code for vulnerabilities. Also, the information could be used to obtain default passwords and other configuration settings that may not have been changed by the network administrator. Thus, in routing protocols such as LLDP, CDP, and the like, no authentication may be configured and/or default credentials may be transmitted with no encryption. Hence, enabling such protocols in the datacenter may have a security issue.

Therefore, customers may prefer to disable such protocols on the network devices in the datacenter. In addition, firewalls such as Cisco Adaptive Security Appliance (ASA) may not even provide the CDP or LLDP implementations for security reasons. Thus, it may not be even a question of choice in some cases and may not be possible to use the CDP/LLDP for such devices. However, the CDP/LLDP may be important for being able to figure out the network device adjacencies in the datacenter. In the absence of the CDP/LLDP, one would have to physically inspect the servers, routers, and other network devices to be able to figure out the connections between the network devices and maintain the connection data in some document, which may have to be updated upon every change. However, manual inspection may be time consuming and prone to errors.

Further, in absence of the CDP/LLDP information, the networking applications may have to depend on Virtual Local Area Network (VLAN) tags on the ports to do an evaluation of the network path. However, when the datacenter is setup using trunk ports instead of access ports between the network devices, there may be no VLAN associated with the ports. In this example, determining the network path using the VLAN tags may fail to work owing to lack of information In another example of pervasive gateways such as in an Ethernet Virtual Private Network (EVPN) fabrics or Network Address Translated (NATed) environments having overlapping Internet Protocols (IPs), there may be a possibly of multiple devices matching next hop interfaces of routes during path computation. The CDP/LLDP neighborhood may facilitate in determining the next hop devices from the matching ones. However, in absence of the CDP/LLDP neighborhood information, finding the exact next hop device in the path may be challenging.

Examples described herein may provide a management node to generate a network topology based on network device information. In one example, the management node may include a storage device to store network device information associated with a plurality of network devices and physical hosts in a datacenter. Example network device information may include at least one of routing information and media access control (MAC) address information. Further, the management node may include a processor operable with the storage device and memory coupled to the processor. In one example, the memory may include a network topology generation unit. In one example, network topology generation unit may determine adjacency between the plurality of network devices in the datacenter using the routing information and/or media access control (MAC) address information associated with the plurality of network devices. Further, the network topology generation unit may generate a network topology including a network path between a source endpoint and a destination endpoint using the adjacency between the plurality of network devices.

Thus, examples described herein may provide an approach to generate the network topology even in the absence of the CDP/LLDP and facilitate the network applications (e.g., vRNI) to work in secure environments.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

System Overview and Examples of Operation

FIG. 1 is a block diagram of an example datacenter 100, including a network topology generation unit 118 to generate a network topology based on network device information. Example datacenter 100 may be a cloud computing environment. For example, cloud computing environment 100 may be VMware vSphere®. Cloud computing environment 100 (e.g., a virtualized cloud computing environment) may include one or more computing platforms that support the creation, deployment, and management of virtual machine-based cloud applications.

Example datacenter 100 may include multiple physical hosts (e.g., 102A and 102B), each executing corresponding ones of endpoints (e.g., virtual machines 104A-104D, containers, and the like). Example physical hosts (e.g., 102A and 102B) may be physical computers. A physical computer may be a hardware-based device (e.g., a personal computer, a laptop, or the like) including an operating system (OS). A virtual machine (e.g., 104A-104D) may operate with its own guest OS on the physical computer using resources of the physical computer virtualized by virtualization software (e.g., a hypervisor, a virtual machine monitor, and the like). A container may be a data computer node that runs on top of host operating system without the need for the hypervisor or separate operating system.

In the below described examples, virtual machines 104A-104D may be considered as the endpoints between which network data may be transmitted. However, the container or physical hosts 102A and 102B may also be considered as the endpoints. Further, datacenter 100 may include a plurality of network devices to receive and route the network data. Example network device may be a layer 3 device or a layer 2 device. For example, International Standards Organization-Open Systems Interconnect (ISO-OSI) has developed a seven-layer reference model to facilitate in describing networks or computer networks. Two important layers of the model are used throughout the document.

For example, Layer 2, a data-link layer, may refer to communication within a Local Area Network (LAN), such as what Ethernet provides. Layer 3, a network layer, may refer to networks that may span multiple LANs, such as Internet Protocol (IP). Further, the network devices that may operate primarily at layer 2 may be referred as the layer 2 devices. For example, primary function of an Ethernet switch (i.e., a layer 2 device) is to forward Ethernet traffic in units called frames to the port on the path towards the destination endpoint. In the example shown in FIG. 1, switches 108A and 108B may be considered as the layer-2 devices.

Similarly, layer-3 devices may refer to devices that operate primarily at layer 3. An example of a layer-3 device may be a router (e.g., 106A and 106B). The primary function of such layer-3 device is to process IP packets and forward them to an interface towards the destination endpoint. Routers 106A and 106B may require hardware that creates a layer-2 (e.g., and layer-1, the physical layer) frame to send the network data to a neighboring device. Despite the existence of such hardware, routers 106A and 106B may be considered as the layer-3 devices because the primary function is to process the network data.

Further, a subnet may be an important concept in a network, such as an IP network. A subnet can be defined as a set of network addresses (or the devices using the addresses) that can communicate directly at layer-3. That is, a physical path between the addresses may contain any number of the layer-2 devices (e.g., switches), but no other layer-3 devices. Example routers 106A and 106B may be the network devices that send the network data between subnets. Further, the subnets can also be defined in terms of IP addresses. An IP address may include 32 bits (or 4 octets, represented as the decimal value of each octet separated by periods). An example IP address, '192.168.3.106', may correspond to a binary representation of the IP address.

Furthermore, the IP address can be divided into two parts, i.e., a subnet address and host address, where the first (most significant) N bits of the address are the subnet address and the remaining bits are the host address. Addresses belonging to the same subnet may have the same subnet address and physical hosts within the subnet may have a different host address. In example datacenter 100, router 106A, switch 108A, and physical host 102A may operate in one subnet while router 106B, switch 108B, and physical host 102B may operate in another subnet.

As shown in FIG. 1, datacenter 100 may include a management node 110. Example management node 110 may include a storage device 112 to store network device information associated with a plurality of network devices (e.g., 106A, 106B, 108A, and 108B) and physical hosts 102A and 102B in datacenter 100. In one example, the network device information may include at least one of routing information and media access control (MAC) address information.

Further, management node 110 may include a processor 114 operable with storage device 112 and memory 116 coupled to processor 114. Example memory 116 may include network topology generation unit 118. During operation, network topology generation unit 118 may determine adjacency between the plurality of network devices (e.g., 106A, 106B, 108A, and 108B) in datacenter 100 using the routing information and/or media access control (MAC) address information associated with the plurality of network devices (e.g., 106A, 106B, 108A, and 108B).

For example, network topology generation unit 118 may determine a first route of a plurality of routes associated with a first network device (e.g., 106A) of the plurality of network devices (e.g., 106A, 106B, 108A, and 108B) using the routing information. In one example, network topology generation unit 118 may determine adjacency between first network device 106A and a second network device 106B using the routing information associated with first network device 106A when the first route is an indirect route. Example determination of adjacency in the indirect route is described with respect to FIG. 2A. In another example, network topology generation unit 118 may determine the adjacency between first network device 106A and a third network device (e.g., 108B) using the MAC address information associated with first network device 106A when the first route is a direct route. Example determination of adjacency in the direct route is described with respect to FIG. 2B.

Further, network topology generation unit 118 may generate the network topology including a network path between a source endpoint (e.g., 104A) and a destination endpoint (e.g., 104C) using the adjacency between plurality of network devices (e.g., 106A, 106B, 108A, and 108B).

In some examples, the functionalities described in FIG. 1, in relation to instructions to implement functions of network topology generation unit 118 and any additional instructions described herein in relation to the storage medium, may be implemented as engines or modules including any combination of hardware and programming to implement the functionalities of the modules or engines described herein. The functions of network topology generation unit 118 may also be implemented by a respective processor. In examples described herein, the processor may include, for example, one processor or multiple processors included in a single device or distributed across multiple devices. In some examples, network topology generation unit 118 can be a part of network management software (e.g., vRNI that is offered by VMware®).

Figure 2A:
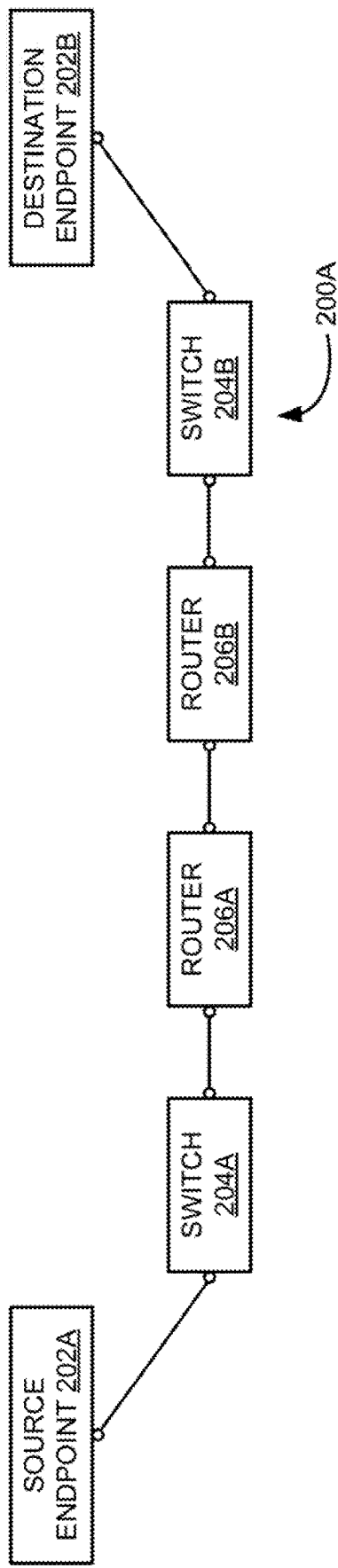
FIG. 2A shows an example indirect route, in accordance with examples described herein.

FIG. 2A shows an example indirect route 200A, in accordance with examples described herein. In one example, indirect route 200A may refer to a network route with intermediate sites or networks and indirect routing may refer to a process of routing network data in indirect route 200A. As shown in FIG. 2A, indirect route 200A may include a source endpoint 202A sending network data (e.g., data packet) to a destination endpoint 202B via a plurality of network devices (e.g., switches 204A and 204B and routers 206A and 206B). Example plurality of network devices may be layer 3 devices and/or layer 2 devices. For example, a layer 3 device may be a router (e.g., routers 206A and 206B), brouter, layer 3 switch, or the like. Example routers 206A and 206B may have connections to more than one network and may provide a gateway between the networks. A layer 2 device may be a layer 2 switch (e.g., switches 204A and 204B), bridge, modem, network card, or the like. Further, source endpoint 202A and destination endpoint 202B may include physical hosts, virtual machines, containers, and the like.

In the examples described herein, for the network data to transmit from source endpoint 202A to destination endpoint 202B, configuration and operational information from intermediate network devices (e.g., switches 204A and 204B, routers 206A and 206B) may be used. For example, the configuration information may be route tables from routers 206A and 206B. The operational information may be MAC-address tables associated with switches 204A and 204B as well as routers 206A and 206B.

Initially, the configuration information and the operational information associated with the network devices (e.g., switches 204A and 204B, routers 206A and 206B) and physical hosts executing endpoints (e.g., source endpoint 202A and destination endpoint 2002B) may be stored in a searchable database such as Postgres, Elasticsearch, and the like. Further, the searchable database may be periodically updated with real-time configuration information and operational information.

In one example, a network topology generation unit (e.g., network topology generation unit 118 of FIG. 1), may determine a first route of a plurality of routes associated with a first network device (e.g., router 206A) of the plurality of network devices (e.g., routers 206A and 206B) using the routing information. For example, for particular incoming network data, a route table may specify either a direct route or an indirect route to destination endpoint 202B. The direct route may specify destination endpoint 202B as the next destination for the particular network data. However, there are many instances in which router 206A which receives the network data may not have a direct communication path to destination endpoint 206B as shown in FIG. 2A. In this example, the route table may specify indirect route 200A for the network data to reach destination endpoint 202B, which may be through another router 206B. Thus, in indirect route 200A, the network data packet may be communicated through multiple routers 206A and 206B as the network data is transmitted along a network path from source endpoint 202A to destination endpoint 202B.

In one example, the network topology generation unit may retrieve a next hop IP address in the first route using the routing information. For example, each time the network data communicates from one network device to a next network device, it may be referred to as a hop. Further, the network topology generation unit may identify a first interface associated with first network device 206A and a second interface corresponding to the retrieved IP address.

Furthermore, the network topology generation unit may determine the second network device adjacent to the first network device based on the first interface and the second interface. For example, the second interface may be a physical port, a logical port, or a virtual local area network (VLAN) port. In one example, when the second interface is a physical port, the network topology generation unit may determine the second network device associated with the physical port as being adjacent to the first network device. In another example, when the second interface is a logical port, the network topology generation unit may determine a physical port associated with the logical port and identify the second network device corresponding to the physical port as being adjacent to the first network device. In yet another example, when the second interface is a VLAN port, the network topology generation unit may identify the second network device corresponding to the VLAN port as the adjacent device to the first network device.

In the above example, each router (e.g., routers 206A and 206B) in a database may be considered. Further, for each route in the route table of the corresponding router, below steps may be performed when the route is indirect route (e.g., 200A).

a. Get a next hop IP address in the indirect route and search the searchable database to identify another router (e.g., a peer router) and associated router interface (or routed port) which may have the same IP address.

b. When the peer router is the same as the current router, the peer router may be ignored and step 'a' may be performed again.

c. When a first interface associated with the current router and a second interface associated with the peer router are physical ports, then an adjacency entry may be created in the database to indicate that the two routers are neighbors connected via a local port (i.e., first interface) and remote port (i.e., second interface).

d. When the first interface and/or second interface are logical ports (e.g., a port channel), member physical ports associated with the corresponding logical ports may be determined. Further, the adjacency entry in the database may be created as in step 'c'.

e. When the first interface and/or second interface are VLAN ports (i.e., a type of logical port), the VLAN ports may be considered as physical ports. Further, the adjacency entry in the database may be created as in step 'c'.

Figure 2B:
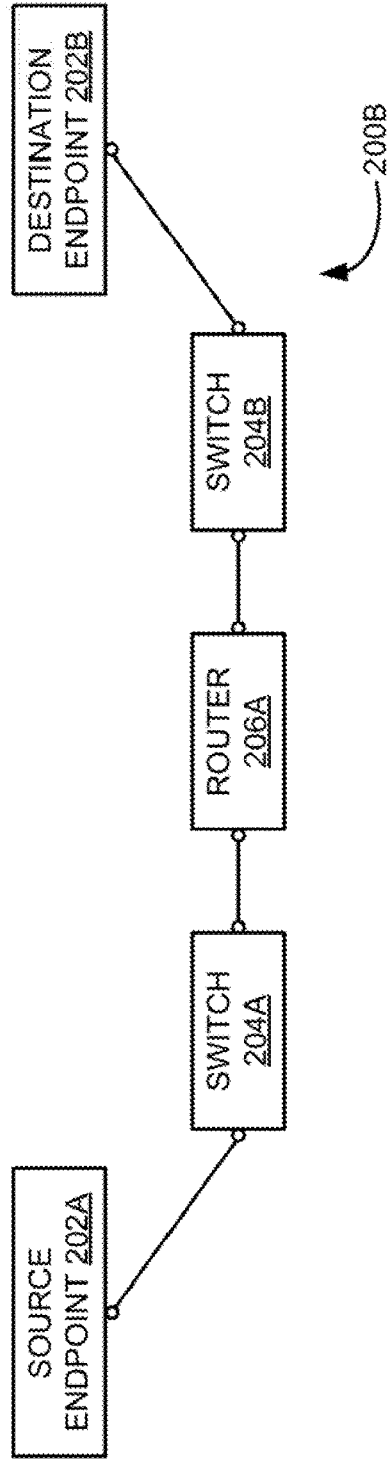
FIG. 2B shows an example direct route, in accordance with examples described herein.

FIG. 2B shows an example direct route 200B, in accordance with examples described herein. In one example, direct route 200B may refer to a network route with no intermediate sites or networks and a process of routing network data in direct route may be referred to as direct routing. As shown in FIG. 2B, direct route 200B may include source endpoint 202A sending network data (e.g., data packet) to destination endpoint 202B directly without having to go through multiple networks.

In one example, the network topology generation unit may retrieve a MAC address associated with an egress interface of first network device 206A using the MAC address information when the first route is the direct route. Further, the network topology generation unit may determine a physical host corresponding to the MAC address. Furthermore, the network topology generation unit may determine a third network device 204B connected to the physical host as being adjacent to first network device 206A based on a physical network interface card (NIC) associated with the physical host and an interface associated with first network device 206A. In one example, the physical NIC and the first interface may include one of a physical port, logical port, and VLAN port.

For example, a router (e.g., router 206A) in the database may be considered. Further, for each route in the route table of the corresponding router, below steps may be performed when the route is direct route (e.g., 200B).

1. Retrieve a MAC address from a MAC address table associated with an egress interface of first network device 206A in direct route 200B.
2. Determine physical hosts associated with the MAC addresses (e.g., virtual machines can be ignored).
3. For each physical host, the physical NIC and the first interface from the direct route may be determined and the adjacency entry may be created in the database as described in steps 'c', 'd', and 'e'.

Thus, with the examples described herein, the adjacencies between the devices and the network path in the datacenter may be determined based on the network device information without using the CDP/LLDP information.

Example Processes

Figure 3A:
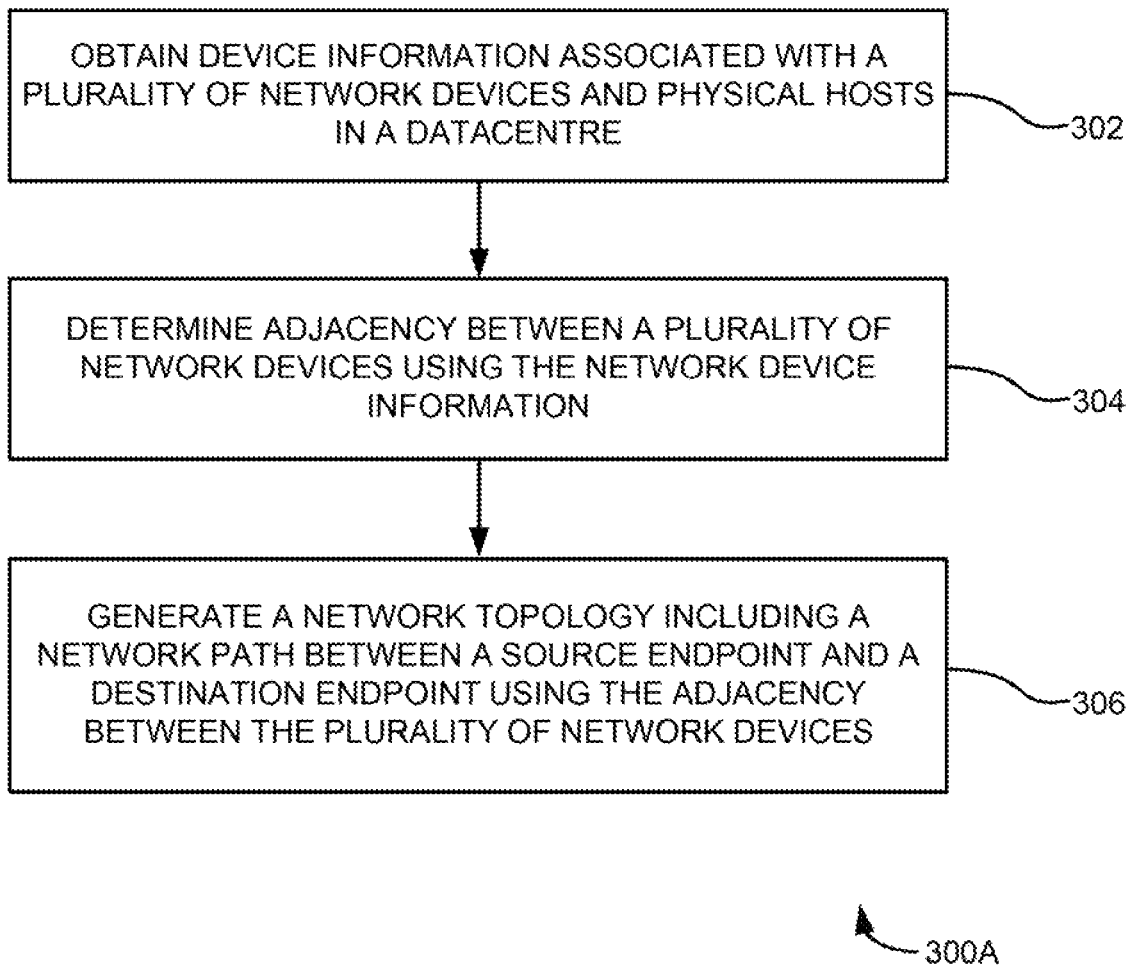
FIG. 3A illustrates an example flow diagram for generating a network topology based on network device information.

FIG. 3A is an example flow diagram 300A illustrating generating a network topology based on network device information. At 302, device information associated with a plurality of network devices and physical hosts in a datacenter may be obtained. Example network device information may include at least one of routing information and media access control (MAC) address information. For example, each of the plurality of network devices may be a layer 3 device or a layer 2 device. The layer 3 device may be a router, brouter, layer 3 switch, or the like. The layer 2 device may be a layer 2 switch, bridge, modem, network card, or the like.

At 304, adjacency between a plurality of network devices may be determined using the network device information. In one example, determining the adjacency between the plurality of network devices may include determining a first route of a plurality of routes associated with a first network device of the plurality of network devices using the routing information. For example, when the first route is an indirect route, adjacency between the first network device and a second network device may be determined using the routing information associated with the first network device. In another example, when the first route is a direct route, the adjacency between the first network device and a third network device may be determined using the MAC address information associated with the first network device. Further, determining the adjacency between the plurality of network devices may be repeated for each route associated with the first network device and remaining network devices having the routing information.

At 306, a network topology including a network path between a source endpoint and a destination endpoint may be generated using the adjacency between the plurality of network devices. Example source endpoint and the destination endpoint may include the physical hosts, virtual machines, and containers.

Figure 3B:
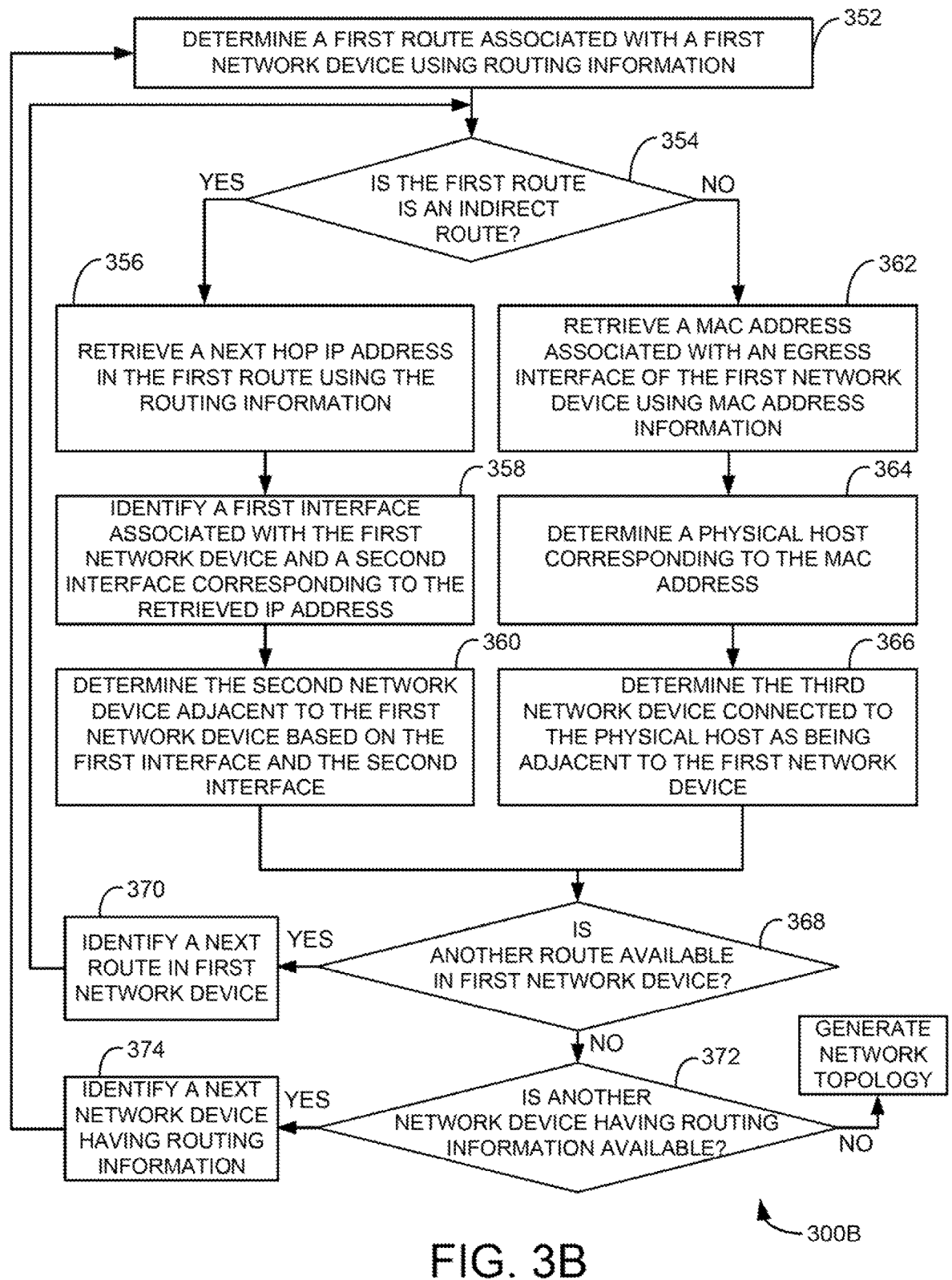
FIG. 3B illustrates another example flow diagram for determining an adjacency between a plurality of network devices.

FIG. 3B is an example flow diagram 300B illustrating determining the adjacency between a plurality of network devices. At 352, a first route of a plurality of routes associated with a first network device of the plurality of network devices may be determined using the routing information. At 354, a check is made to determine whether the first route is indirect route or direct route.

When the first route is determined as indirect route, a next hop internet protocol (IP) address in the first route may be retrieved using the routing information, at 356. At 358, a first interface associated with the first network device and a second interface corresponding to the retrieved IP address may be identified. At 360, the second network device adjacent to the first network device may be determined based on the first interface and the second interface. In one example, when the second interface is a physical port, the second network device associated with the physical port may be determined as being adjacent to the first network device. In another example, when the second interface is a logical port, a physical port associated with the logical port may be determined and the second network device corresponding to the physical port may be identified as being adjacent to the first network device. In yet another example, when the second interface is a virtual local area network (VLAN) port, the second network device corresponding to the VLAN port may be identified as the adjacent device to the first network device.

When the first route is determined as direct route, a MAC address associated with an egress interface of the first network device may be retrieved using the MAC address information, at 362. At 364, a physical host corresponding to the MAC address may be determined. At 366, the third network device connected to the physical host may be determined as being adjacent to the first network device based on a physical network interface card (NIC) associated with the physical host and an interface associated with the first network device. In one example, the physical NIC and the first interface may include one of a physical port, logical port, and VLAN port.

At 368, a check is made to determine whether there is another route available corresponding to the first network device. At 370, when there is another route, a next route associated with the first network device may be identified and steps of 354 to 368 may be repeated to determine the adjacency between the plurality of network devices for each route associated with the first network device. At 372, when there are no routes available, a check is made to determine whether there is another network device having routing information available in the datacenter. At 374, when there is another network device, then a next network device having the routing information may be identified and steps of 352 to 374 may be repeated to determine the adjacency between the plurality of devices. This process may be repeated for all the network devices having the routing information (i.e., for all the routers) in the datacenter. At 376, the network topology may be generated using the determined adjacency between the plurality of network devices.

It should be understood that the process depicted in FIGS. 3A and 3B represent generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Figure 4:
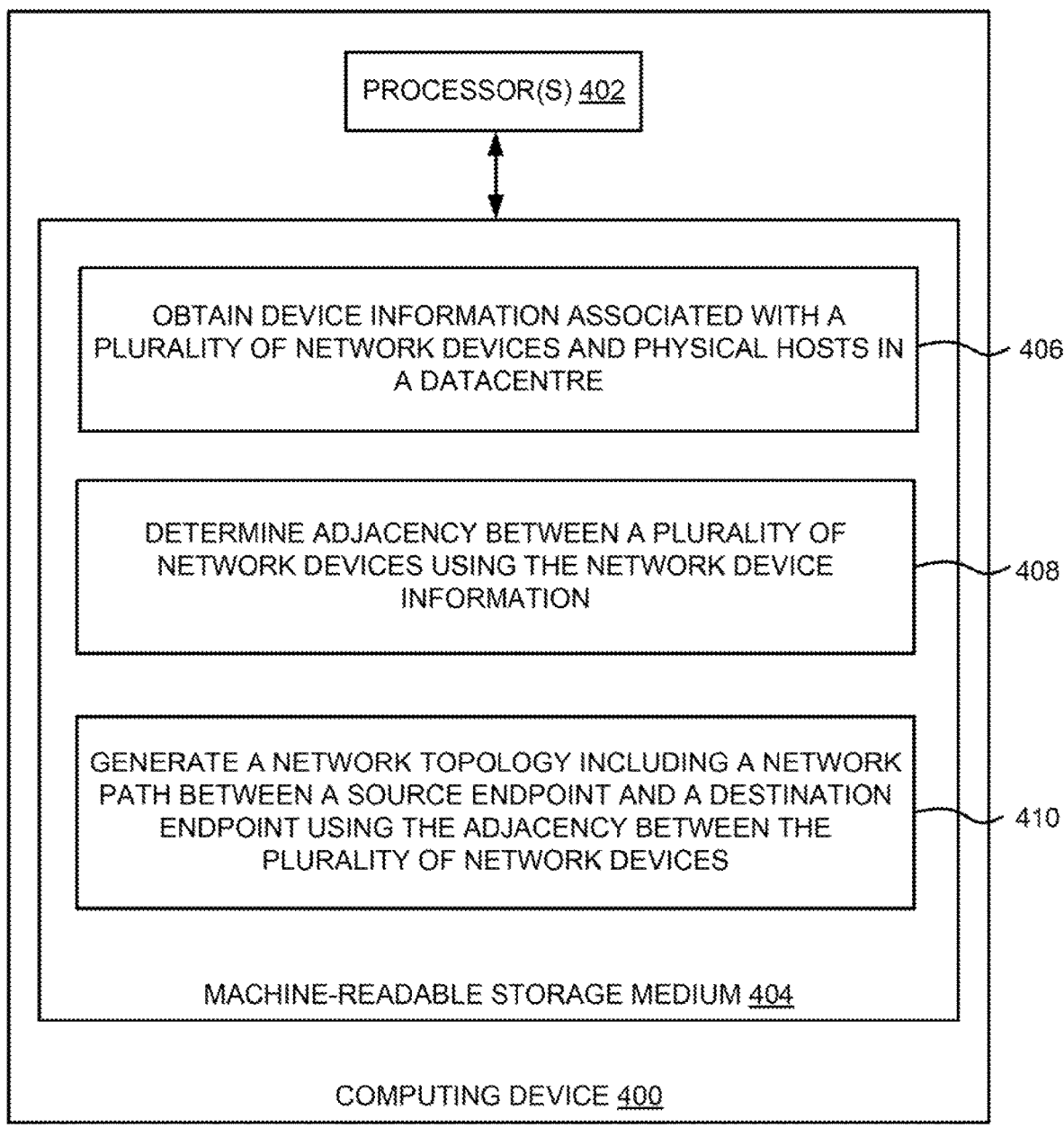
FIG. 4 is a block diagram of an example computing device including non-transitory computer-readable storage medium storing instructions to generate a network topology based on network device information.

FIG. 4 is a block diagram of an example computing device 400 including non-transitory computer-readable storage medium 404 storing instructions to generate a network topology based on network device information. Computing device 400 may include a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to computing system 400.

Machine-readable storage medium 404 may store instructions 406-410. In an example, instructions 406-410 may be executed by processor 402 to generate the network topology based on the network device information. Instructions 406 may be executed by processor 402 to obtain device information associated with a plurality of network devices and physical hosts in a datacenter. In one example, the network device information may include at least one of routing information and media access control (MAC) address information. Further, instructions may be executed by processor 402 to store the network device information associated with the plurality of network devices and physical hosts in a searchable database.

Instructions 408 may be executed by processor 402 to determine adjacency between a plurality of network devices using the network device information. Example instructions to determine the adjacency between the plurality of network devices may include instructions to determine a first route of a plurality of routes associated with a first network device of the plurality of network devices using the routing information. In one example, the instructions may include to determine adjacency between the first network device and a second network device using the routing information associated with the first network device when the first route is an indirect route.

In another example, the instructions may include to determine the adjacency between the first network device and a third network device using the MAC address information associated with the first network device when the first route is a direct route. Further, the instructions to determine the adjacency between the plurality of network devices further include instructions to determine the adjacency between the plurality of network devices by repeating the above instructions for each route associated with the first network device and remaining network devices having the routing information.

Instructions 410 may be executed by processor 402 to generate a network topology including a network path between a source endpoint and a destination endpoint using the adjacency between the plurality of network devices.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A management node comprising:
a storage device to store network device information associated with a plurality of network devices and physical hosts in a datacenter, wherein the network device information comprises at least one of routing information and media access control (MAC) address information;
a processor operable with the storage device; and
memory coupled to the processor, wherein the memory comprises a network topology generation unit to:
determine adjacency between the plurality of network devices in the datacenter using the routing information and/or media access control (MAC) address information associated with the plurality of network devices, wherein the network topology generation unit is to:
a. determine a first route of a plurality of routes associated with a first network device of the plurality of network devices using the routing information;
b. when the first route is an indirect route. determine adjacency between the first network device and a second network device using the routing information associated with the first network device by;
retrieving a next hop internet protocol (IP) address in the first route using the routing information;
identifying a first interface associated with the first network device and a second interface corresponding to the retrieved IP address; and
determining the second network device adjacent to the first network device based on the first interface and the second interface; and
c. when the first route is a direct route, determine the adjacency between the first network device and a third network device using the MAC address information associated with the first network device; and
generate a network topology including a network path between a source endpoint and a destination endpoint using the adjacency between the plurality of network devices.

2. The management node of claim 1, wherein the network topology generation unit is to determine the adjacency between the plurality of network devices by repeating the steps a, b, and c of claim 1 for each route associated with the first network device and remaining network devices having the routing information.

3. The management node of claim 1, wherein the network topology generation unit is to:
when the second interface is a physical port, determine the second network device associated with the physical port as being adjacent to the first network device.

4. The management node of claim 1, wherein the network topology generation unit is to:
when the second interface is a logical port,
determine a physical port associated with the logical port; and
identify the second network device corresponding to the physical port as being adjacent to the first network device.

5. The management node of claim 1, wherein the network topology generation unit is to:
when the second interface is a virtual local area network (VLAN) port, identify the second network device corresponding to the VLAN port as the adjacent device to the first network device.

6. A management node comprising:
a storage device to store network device information associated with a plurality of network devices and physical hosts in a datacenter, wherein the network device information comprises at least one of routing information and media access control (MAC) address information:
a processor operable with the storage device; and
memory coupled to the processor, wherein the memory comprises a network topology generation unit to:
determine adjacency between the plurality of network devices in the datacenter using the routing information and/or media access control (MAC) address information associated with the plurality of network devices, wherein the network topology generation unit is to:
determine a first route of a plurality of routes associated with a first network device of the plurality of network devices using the routing information;
when the first route is an indirect route, determine adjacency between the first network device and a second network device using the routing information associated with the first network device; and when the first route is a direct route, determine the adjacency between the first network device and a third network device using the MAC address information associated with the first network device by:

retrieving a MAC address associated with an egress interface of the first network device using the MAC address information;

determining a physical host corresponding to the MAC address; and determining the third network device connected to the physical host as being adjacent to the first network device based on a physical network interface card (NIC) associated with the physical host and an interface associated with the first network device, wherein the physical NIC comprises one of a physical port, logical port, and VLAN port; and generate a network topology including a network path between a source endpoint and a destination endpoint using the adjacency between the plurality of network devices.

7. The management node of claim 1, wherein each of the plurality of network devices is a layer 3 device or a layer 2 device.

8. The management node of claim 7, wherein the layer 3 device is a router, brouter, or layer 3 switch, and wherein the layer 2 device is a layer 2 switch, bridge, modem, or network card.

9. The management node of claim 1, wherein the source endpoint and the destination endpoint comprise the physical hosts, virtual machines, and containers.

10. The management node of claim 1, wherein the storage device comprises:

a searchable database to store configuration information and operational information associated with the plurality of network devices and the physical hosts.

11. A computer implemented method comprising:

obtaining device information associated with a plurality of network devices and physical hosts in a datacenter, wherein the network device information comprises at least one of routing information and media access control (MAC) address information;

determining adjacency between a plurality of network devices using the network device information, wherein determining the adjacency between the plurality of network devices comprises:

a. determining a first route of a plurality of routes associated with a first network device of the plurality of network devices using the routing information b. when the first route is an indirect route, determining adjacency between the first network device and a second network device using the routing information associated with the first network device by:

retrieving a next hop Internet protocol (IP) address in the first route using the routine information identifying a first interface associated with the first network device and a second interface corresponding to the retrieved IP address; and determining the second network device adjacent to the first network device based on the first interface and the second interface; and c. when the first route is a direct route, determining the adjacency between the first network device and a third network device using the MAC address information associated with the first network device; and generating a network topology including a network path between a source endpoint and a destination endpoint using the adjacency between the plurality of network devices.

12. The computer implemented method of claim 11, wherein determining the adjacency between the plurality of network devices further comprises determining the adjacency between the plurality of network devices by repeating the steps a, b, and c of claim 11 for each route associated with the first network device and remaining network devices having the routing information.

13. The computer implemented method of claim 11, wherein determining the second network device adjacent to the first network device comprises:

when the second interface is a physical port, determining the second network device associated with the physical port as being adjacent to the first network device.

14. The computer implemented method of claim [ 161] 13, wherein determining the second network device adjacent to the first network device comprises:

when the second interface is a logical port, determining a physical port associated with the logical port; and identifying the second network device corresponding to the physical port as being adjacent to the first network device.

15. The computer implemented method of claim 11, wherein determining the second network device adjacent to the first network device comprises:

when the second interface is a virtual local area network (VLAN) port, identifying the second network device corresponding to the VLAN port as the adjacent device to the first network device.

16. A computer implemented method comprising:

obtaining device information associated with a plurality of network devices and physical hosts in a datacenter, wherein the network device information comprises at least one of routing information and media access control (MAC) address information:

determining adjacency between a plurality of network devices using the network device information, wherein determining the adjacency between the plurality of network devices comprises:

determining a first route of a plurality of routes associated with a first network device of the plurality of network devices using the routing information;

When the first route is an indirect route, determining adjacency between the first network device and a second network device using the routing information associated with. the first network device; and when the first route is a direct route, determining adjacency between the first network device and a third network device using the MAC address information associated with the first network device by:

retrieving a MAC address associated with an egress interface of the first network device using the MAC address information;

determining a physical host corresponding to the MAC address; and determining the third network device connected to the physical host as being adjacent to the first network device based on a physical network interface card (NIC) associated with the physical host and an interface associated with the first network device, wherein the physical NIC comprises one of a physical port, logical port, and VLAN port; and generating a network topology including, a network path between a source endpoint and a destination endpoint using the adjacency between the plurality of network devices.

17. A non-transitory machine-readable storage medium encoded with instructions that, when executed by a computer, cause the computer to:

obtain device information associated with a plurality of network devices and physical hosts in a datacenter, wherein the network device information comprises at least one of routing information and media access control (MAC) address information;

determine adjacency between a plurality of network devices using the network device information, wherein instructions to determine the adjacency between the plurality of network devices comprise instructions to:
  a. determine a first route of a plurality of routes associated with a :first network device of the plurality of network devices using the routing information;
  b. when the first route is an indirect route, determine adjacency between the first network device and a second network device using the routing information associated with the first network device by:
      retrieving a next hop internet protocol (IP) address in the first route using the routing information;
      identifying a first interface associated with the first network device and a second interface corresponding to the retrieved IP address; and
      determining the second network device adjacent to the first network device based on the first interface and the second interface; and
  c. when the first route is a direct route, determine the adjacency between the first network device and a third network device using the MAC address information associated with the first network device; and generate a network topology including a network path between a source endpoint and a destination endpoint using the adjacency between the plurality of network devices.

18. The non-transitory machine-readable storage medium of claim 17, wherein instructions to determine the adjacency between the plurality of network devices further comprise instructions to determine the adjacency between the plurality of network devices by repeating the instructions a, b, and c of claim 17 for each route associated with the first network device and remaining network devices having the routing, information.

19. The non-transitory machine-readable storage medium of claim 17, wherein the instructions to determining the second network device adjacent to the first network device comprise instructions to:

when the second interface is a physical port, determine the second network device associated with the physical port as being adjacent to the first network device.

20. The non-transitory machine-readable storage medium of claim 17, wherein the instructions to determine the second network device adjacent to the first network device comprise instructions to:

when the second interface is a logical port,
  determine a physical port associated with the logical port; and
  identify the second network device corresponding, to the physical port as being adjacent to the first network device.

21. The non-transitory machine-readable storage medium of claim 17, wherein the instructions to determine the second network device adjacent to the first network device comprise instructions to:

when the second interface is a virtual local area network (VLAN) port, identify the second network device corresponding to the VLAN port as the adjacent device to the first network device.

22. The A non-transitory machine-readable storage medium of encoded with instructions that, when executed by a computer, cause the computer to:

obtain device information associated with a plurality of network devices and physical hosts in a datacenter, wherein the network device information comprises at least one of routing information and media access control (MAC) address information;

determine adjacency between a plurality of network devices using the network device information, wherein instructions to determine the adjacency between the plurality of network devices comprise instructions to:
  determine a first route of a plurality of routes associated with a first network device of the of network devices using the routing information,
  when the first route is an indirect route, determine adjacency between the first network device and a second network device using the routing information associated with the first network device; and
  when the first route is a direct route, determine the adjacency between the first network device and a third network device using the MAC address information associated with the first network device by:
      retrieving a MAC address associated with an egress interface of the first network device using the MAC address information;
      determining a physical host corresponding to the MAC address; and
      determining the third network device connected to the physical host as being adjacent to the first network device based on a physical network interface card (NIC) associated with the physical host and an interface associated with the first network device, wherein the physical NIC comprises one of a physical port, logical port, and VLAN port; and generate a network topology including a network path between a source endpoint and a destination endpoint using the adjacency between the plurality of network devices.

* * * * *